US008929359B2

(12) United States Patent
Andriolli et al.

(10) Patent No.: US 8,929,359 B2
(45) Date of Patent: Jan. 6, 2015

(54) CONFIGURING SYNCHRONOUS OPTICAL SWITCHES

(75) Inventors: Nicola Andriolli, Rovigo (IT); Alberto Bianchi, Marina di Pisa (IT); Piero Castoldi, Parma (IT); Pier Giorgio Raponi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 681 days.

(21) Appl. No.: 13/141,223

(22) PCT Filed: Dec. 22, 2008

(86) PCT No.: PCT/EP2008/068148
§ 371 (c)(1),
(2), (4) Date: Sep. 19, 2011

(87) PCT Pub. No.: WO2010/072247
PCT Pub. Date: Jul. 1, 2010

(65) Prior Publication Data
US 2012/0008946 A1 Jan. 12, 2012

(51) Int. Cl.
*H04L 12/66* (2006.01)
*H04J 14/02* (2006.01)
*H04Q 11/00* (2006.01)

(52) U.S. Cl.
CPC ........ *H04J 14/0227* (2013.01); *H04Q 11/0005* (2013.01)
USPC ............................................ 370/352; 398/49

(58) Field of Classification Search
CPC ............... H04J 14/005; H04J 14/0227; H04Q 11/0005; H04Q 11/0066; H04Q 11/0062
See application file for complete search history.

(56) References Cited

U.S. PATENT DOCUMENTS

| 6,466,343 | B1 | 10/2002 | Lahat et al. |
| 7,263,288 | B1* | 8/2007 | Islam .............................. 398/49 |
| 8,165,468 | B2* | 4/2012 | Boduch et al. ................. 398/83 |
| 2002/0018260 | A1* | 2/2002 | Kisovec et al. ............... 359/124 |
| 2004/0208418 | A1* | 10/2004 | Handelman ..................... 385/15 |
| 2005/0286894 | A1* | 12/2005 | Duelk ............................ 398/75 |
| 2006/0051094 | A1* | 3/2006 | Moriwaki et al. ............. 398/84 |
| 2006/0171712 | A1* | 8/2006 | Tanaka et al. .................. 398/45 |
| 2007/0025731 | A1* | 2/2007 | Schofield et al. .............. 398/45 |

(Continued)

OTHER PUBLICATIONS

Keslassy, I. et al., "Scaling Internet Routers Using Optics", Computer Communications Review, vol. 33, No. 4, (Oct. 1, 2003), pp. 189-200.
Kesselman, A. et al., "Non-preemptive Scheduling of Optical Switches", Global Telecommunications Conference, vol. 3, (Nov. 29, 2004), pp. 1840-1844.

(Continued)

*Primary Examiner* — Phirin Sam
(74) *Attorney, Agent, or Firm* — Nixon & Vanderhye P.C.

(57) ABSTRACT

A method (10) of configuring a synchronous optical switch to route received data cells. The synchronous optical switch comprises optical switch transmitter modules, each comprising tunable optical transmitters, optical switch receiver modules, each comprising optical receivers, and optical connections between the transmitter modules and receiver modules. For each optical switch transmitter module, the method: assigns (12) wavelengths associated with the received data cells to the transmitters such that each wavelength is assigned to a different transmitter; and generates (14) a control signal for controlling the operating wavelength of each transmitter. For each wavelength, the method: allocates (16) to each transmitter an optical connection such that each optical switch transmitter module has no more than one connection exiting it at said wavelength and each optical receiver module has no more than one connection entering it at said wavelength; and generates (18) a control signal for connecting each transmitter to the respective optical connection.

16 Claims, 8 Drawing Sheets

(56) References Cited

U.S. PATENT DOCUMENTS

| | | | |
|---|---|---|---|
| 2007/0077072 A1* | 4/2007 | Kunimatsu et al. | 398/135 |
| 2007/0110087 A1* | 5/2007 | Abel et al. | 370/412 |
| 2007/0189663 A1* | 8/2007 | Hirai et al. | 385/24 |
| 2008/0193133 A1* | 8/2008 | Krug et al. | 398/83 |
| 2008/0219269 A1* | 9/2008 | Minkenberg et al. | 370/395.4 |

OTHER PUBLICATIONS

Nick McKeown, The iSLIP Scheduling Algorithm for Input-Queued Switches, IEEE/ACM Transactions on Networking, vol. 7, No. 2, Apr. 1999, pp. 188-201.

Odile Liboiron-Ladouceur et al., The Data Vortex Optical Packet Switched Interconnection Network, Journal of Lightwave Technology, vol. 26, No. 13, Jul. 1, 2008, pp. 1777-1789.

* cited by examiner ures, likely at data throughput rates in the range of
CONFIGURING SYNCHRONOUS OPTICAL SWITCHES This application is the U.S. national phase of International Application No. PCT/EP2008/068148, filed 22 Dec. 2008, which designated the U.S., the entire content of which is hereby incorporated by reference.

FIELD OF THE INVENTION

The invention relates to a method of configuring a synchronous optical switch and to a router comprising a synchronous optical switch.

BACKGROUND OF THE INVENTION

The amount and data rate of traffic transmitted across optical communications networks continues to increase and network routers will therefore be required to route data at faster and faster rates, likely at data throughput rates in the range of tens or hundreds of Terabits per second (Tb/s). Electronic interconnection networks currently used within routers are approaching their fundamental operational limitations, particularly in terms of their power density.

Optical packet switches have been proposed as a solution for geographic area networks, where optical packets are transparently switched across several nodes of the network before reaching the destination. However, the limited capabilities of optical buffering and synchronization and issues related to the quality of transmission have significantly hampered this solution. Nevertheless optical packet switching is emerging as a feasible candidate to handle communications on smaller network scales where high transmission and switching capacity is required [O. Liboiron-Ladouceur et al., "The Data Vortex Optical Packet Switched Interconnection Network", JLT, July 2008].

SUMMARY OF THE INVENTION

It is an object to provide an improved method of configuring a synchronous optical packet switch and to provide an improved router.

A first aspect of the present invention provides a method of configuring a synchronous optical switch to route received data cells. The synchronous optical switch comprises a first plurality of optical switch transmitter modules each comprising a second plurality of tunable optical transmitters. The synchronous optical switch further comprises a said first plurality of optical switch receiver modules each comprising a said second plurality of optical receivers. The synchronous optical switch further comprises a third plurality of optical connections between the said transmitter modules and the said receiver modules. The method comprises the steps:
  a. for each optical switch transmitter module, assigning wavelengths associated with the received data cells to said transmitters such that each said wavelength is assigned to a different one of said transmitters;
  b. for each said optical switch transmitter module, generating a first control signal for controlling the operating wavelength of each said transmitter;
  c. for each said wavelength, allocating to each transmitter assigned said wavelength one of said optical connections coupled to an optical receiver configured to receive said wavelength. The optical connections are allocated such that each optical switch transmitter module has no more than one connection exiting it at said wavelength and each optical receiver module has no more than one connection entering it at said wavelength; and
  d. generating a second control signal for connecting each said transmitter to the respective said optical connection.

The method provides for efficient data routing across a synchronous optical switch. The method allows for switch scalability in terms of the number of optical switch transmitter modules and optical switch receiver modules comprising the synchronous optical switch. The method may be used to configure a synchronous optical switch comprising a plurality of transmitter/receiver cards. The method may be used to configure multi-card modular wavelength division multiplexed (WDM) optical packet switches. In the method, steps a. and c. can be specified to meet desired complexity and performance requirements.

By assigning the wavelengths within the optical switch transmitter modules in one step and allocating the optical connections to the transmitters for each wavelength in a separate step, the method has a much lower computational complexity than known single-steps scheduling algorithms. The method can therefore be used in connection with large switches which many known, high-performance scheduling algorithms cannot be used with, since the known algorithms cannot perform the scheduling within the tight time constraints required by such switches.

In an embodiment, the method further comprises, prior to step a., storing received data cells received for each said tunable optical transmitter according to wavelength and destination optical switch receiver module data associated with each data cell. In an embodiment, the received data cells are respectively stored in an input buffer associated with each said tunable optical transmitter. The input buffer may be partitioned into a number of virtual output queues equal to the said plurality of wavelengths multiplied by the said plurality of optical switch receiver modules. The method comprises, for each said tunable optical transmitter, storing said received data cells in respective virtual output queues according to said wavelength and destination optical switch receiver module data.

In an embodiment, step a. comprises assigning said wavelengths to said transmitters by:
  i. identifying the greatest number of cells stored at any of said wavelengths for any of said transmitters;
  ii. allocating the wavelength for which said greatest numbers of cells are stored to the said transmitter for which said cells were received;
  iii. identifying the transmitter having the next greatest number of cells stored at any of said wavelengths for any of said transmitters;
  iv. determining whether the wavelength for which said next greatest number of cells are stored has previously been allocated to a said transmitter;
  v. if the said wavelength has not previously been allocated, allocating the wavelength for which said next greatest numbers of cells are stored to the said transmitter for which said cells were received. If the said wavelength has previously been allocated, repeating steps iii. to v.; and
  vi. repeating steps iii. and v. until a different one of said wavelengths has been allocated to each of said transmitters.

In an embodiment, the method further comprises, for each tunable optical transmitter, counting the number of cells stored in each said virtual output queue for each of said plurality of wavelengths and storing the counted number of cells in a counter for each said wavelength. Step i. comprises identifying the greatest number of cells stored at any of said wavelengths for any of said transmitters by identifying the counter having the largest number of counted cells.

In an alternative embodiment, step a. comprises assigning said wavelengths to said transmitters by:
 i. identifying the oldest cell stored at any of said wavelengths for any of said transmitters;
 ii. allocating the wavelength for which said oldest cell is stored to the said transmitter for which said cells were received;
 iii. identifying the next oldest cell stored at any of said wavelengths for any of said transmitters;
 iv. determining whether the wavelength for which said next oldest cell is stored has previously been allocated to a said transmitter;
 v. if the said wavelength has not previously been allocated, allocating the wavelength for which said next oldest cell is stored to the transmitter for which said cells were received. If the said wavelength has previously been allocated, repeating steps iii. to v; and
 vi. repeating steps iii. to v. until a different one of said wavelengths has been allocated to each of said transmitters.

In an embodiment, step a. is carried out simultaneously for each of said plurality of optical switch transmitter modules.

Step b. may further comprise generating a second control signal for transmitting information identifying the wavelength setting for each said transmitter for use in step c.

In an embodiment, in step c. said allocation to each transmitter of one of said optical connections comprises, for each said wavelength, considering the transmitters allocated said wavelength as a set of source nodes and considering the receivers configured to receive said wavelength as a set of destination nodes of a bipartite graph. A maximal matching scheduling algorithm is applied to find the best matching in the bipartite graph. The maximal matching scheduling algorithm may be an iterative maximal matching scheduling algorithm. The iterative maximal matching scheduling algorithm may comprise one of an iterative serial-line IP (iSLIP) matching algorithm, an iterative dual round-robin matching (DRRM) algorithm, and a parallel iterative matching (PIM) algorithm.

Step c. may be carried out simultaneously for each of said plurality of wavelengths.

When a further transmitter/receiver card, and thus an additional optical transmitter module and optical receiver module, is added to the switch the impact on the total complexity of the method is limited, mainly due to this parallel implementation of each of steps a. and c.

The steps of the method may be completed within a single cell time. The steps of the method may alternatively be completed over a plurality of subsequent cell times. By assigning the wavelengths within the optical switch transmitter modules in one step and allocating the optical connections to the transmitters for each wavelength in a separate step, the method may thus be completed over a plurality of subsequent cell times ("pipelined"). As a result, more complex algorithms can be adopted within each step of the method.

A second aspect of the invention comprises a router comprising a synchronous optical switch. The synchronous optical switch comprises: a switch control unit; a first plurality of optical switch transmitter modules each comprising a second plurality of tunable optical transmitters and a module control unit; a said first plurality of optical switch receiver modules each comprising a said second plurality of optical receivers; and a third plurality of optical connections between the said transmitter modules and the said receiver modules. Each said module control unit is arranged to assign wavelengths associated with received data cells to the said transmitters of its respective said module. The wavelengths are assigned such that each said wavelength is assigned to a different one of said transmitters. Each said module control unit is further arranged to generate a first control signal for controlling the wavelength setting of each said transmitter. The switch control unit is arranged to, for each said wavelength, allocate to each transmitter assigned said wavelength one of said optical connections coupled to an optical receiver configured to receive said wavelength. The optical connections are allocated such that each optical switch transmitter module has no more than one connection exiting it at said wavelength and each optical receiver module has no more than one connection entering it at said wavelength. The switch control unit is further arranged to generate a second control signal for connecting each said transmitter to the respective said optical connection.

A computer program product comprising program code for performing any of the above method steps.

A data carrier having computer readable instructions embodied therein for providing access to resources available on a router. The computer readable instructions comprise instructions to cause the router to perform any of the above method steps.

DESCRIPTION OF EMBODIMENTS OF THE INVENTION

Referring to FIGS. 1 to 7, a first embodiment of the invention provides a method 10 of configuring a synchronous optical switch 60.

Figure 3:
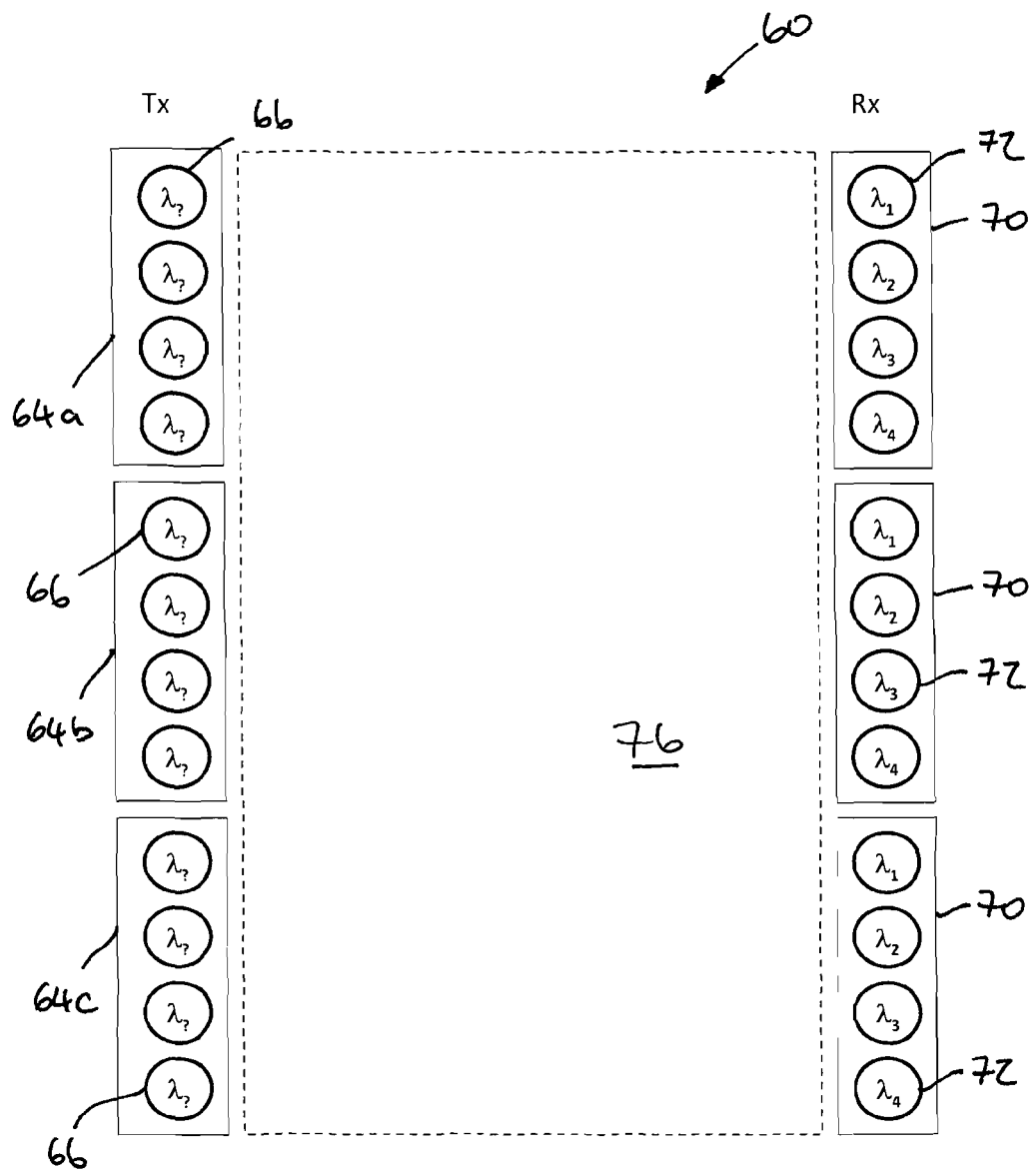
FIG. 3 is a schematic representation of part of a synchronous optical switch suitable for being configured using the method of FIG. 1.
Figure 7:
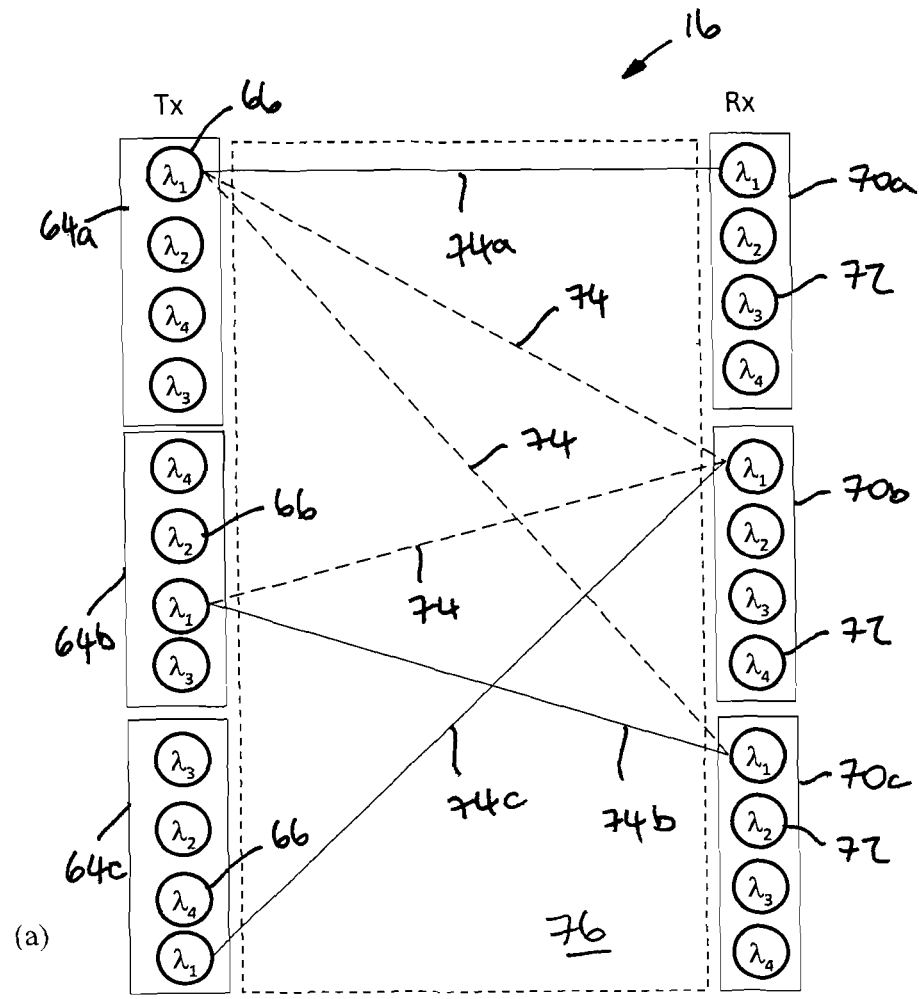
FIG. 7 is (a) a schematic representation of the step of allocating each transmitter at one wavelength ($\lambda_1$) optical connections to the respective receivers (Rx) configured to receive that wavelength, and (b) a bi-partite graph representing the transmitters and receivers at that wavelength.
Figure 7:
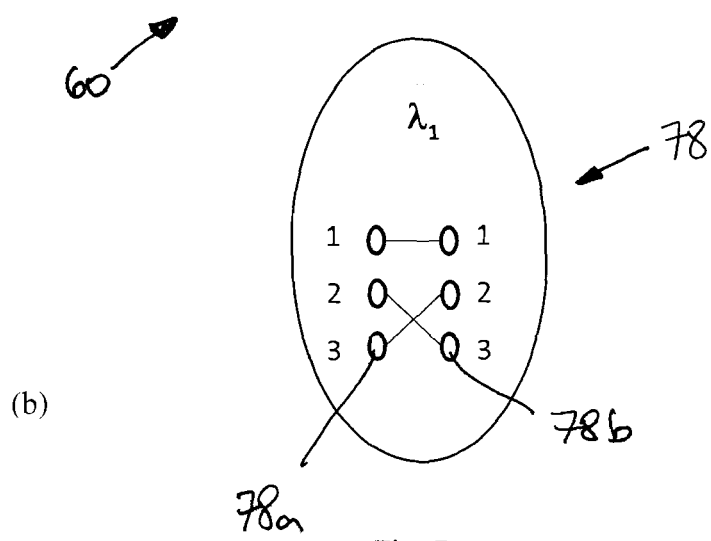

A synchronous optical switch 60 suitable for being configured according to the method 10 is shown in part in FIGS. 3 and 7 and comprises a first plurality (three in this example) of optical switch transmitter modules 64a, 64b, 64c and a corresponding plurality (three) of optical switch receiver modules 70. Each transmitter module 64a, 64b, 64c comprises a second plurality (four in this example) of tunable optical transmitters 66. Each receiver module 70 comprises a corresponding plurality (four) of fixed optical receivers 72. The tunable optical transmitters 66 and optical receivers 72 are connected via an optical backplane 76 comprising a third plurality of optical connections 74. The number of optical connections 74 is equal to the number of transmitter modules 64a, 64b, 64c (C) multiplied by the number of tunable optical transmitters 66 (L), and in this example equals twelve optical connections 74 (only five are shown in the drawings for reasons of clarity).

The synchronous optical switch 60 is configured to receive data cells to be routed. Each data cell is provided with a header identifying the tunable optical transmitter 66 that it is to be routed through, the wavelength that it is to be routed on and the receiver module 70 to which it is to be routed. The synchronous optical switch 60 is an optical packet switch which routes data in packets, a set number of packets, equal to the number of tunable optical transmitters 66, being routed during a specified time slot.

Figure 1:
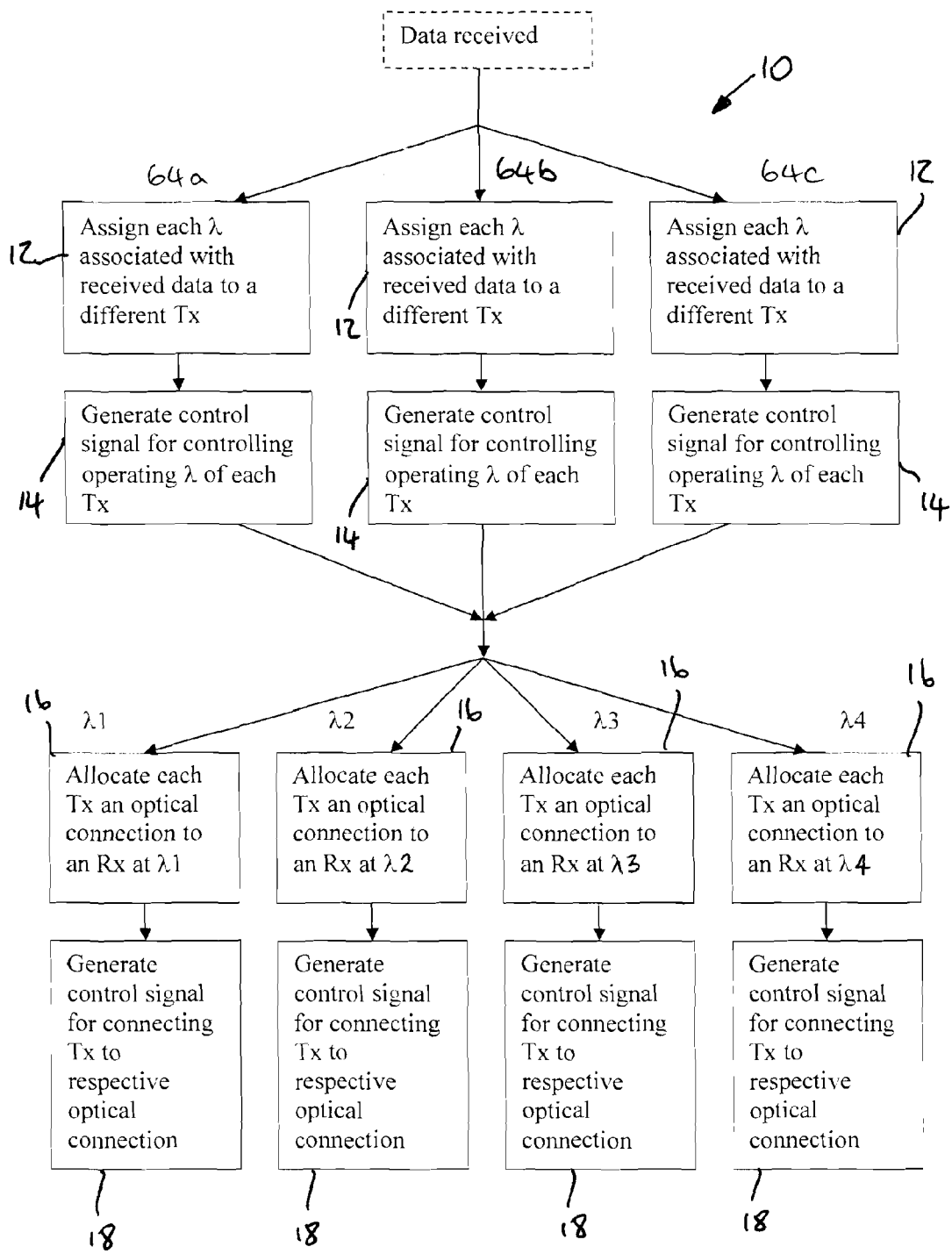
FIG. 1 is a flow diagram of a method of configuring a synchronous optical switch according to a first embodiment of the invention.
Figure 2:
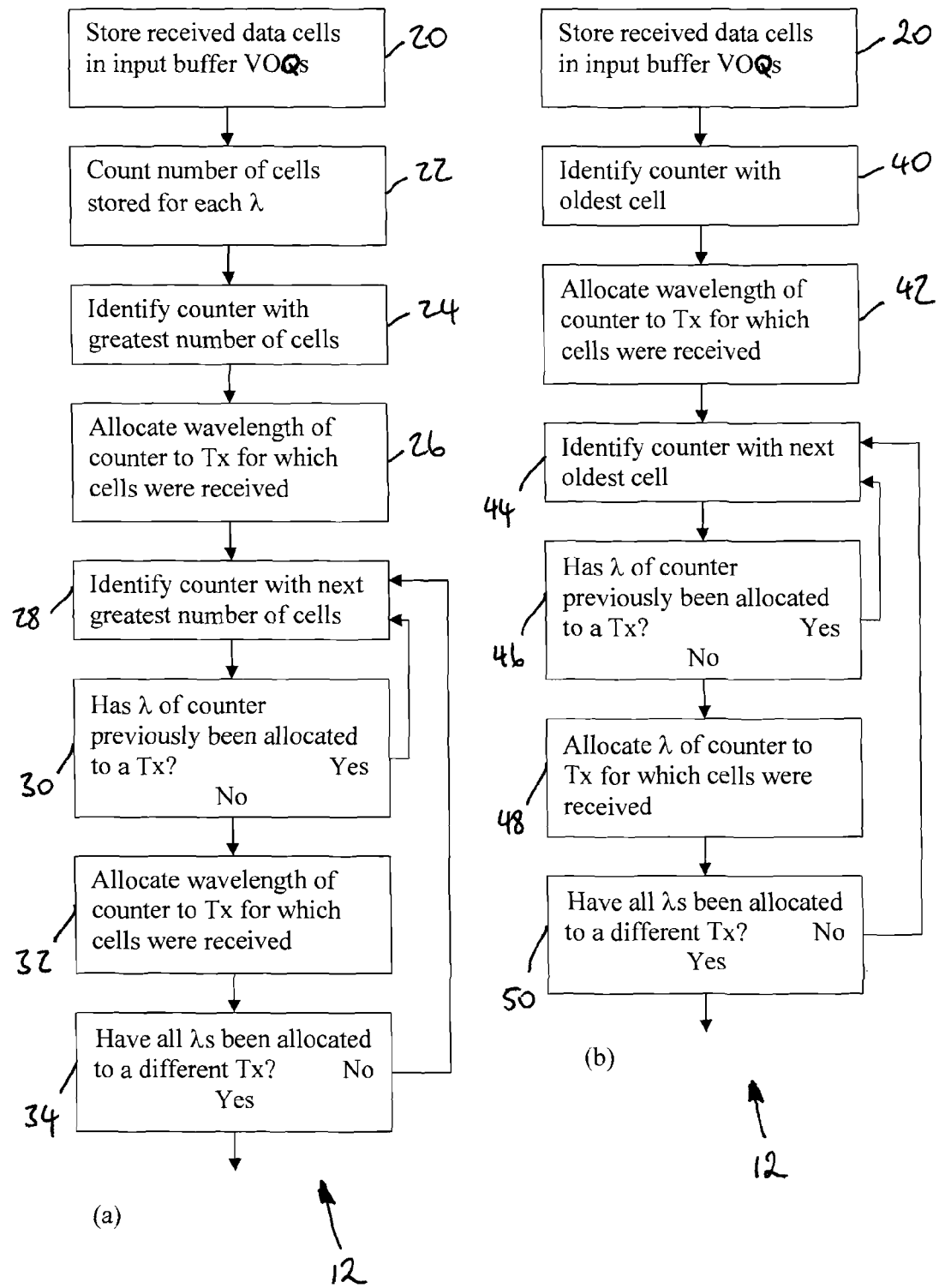
FIG. 2 (a) is a flow diagram of a first set of method steps of assigning each wavelength associated with received data to a different transmitter of the method of FIG. 1, and (b) is a flow diagram of a second set of method steps of assigning each wavelength associated with received data to a different transmitter of the method of FIG. 1.
Figure 4:
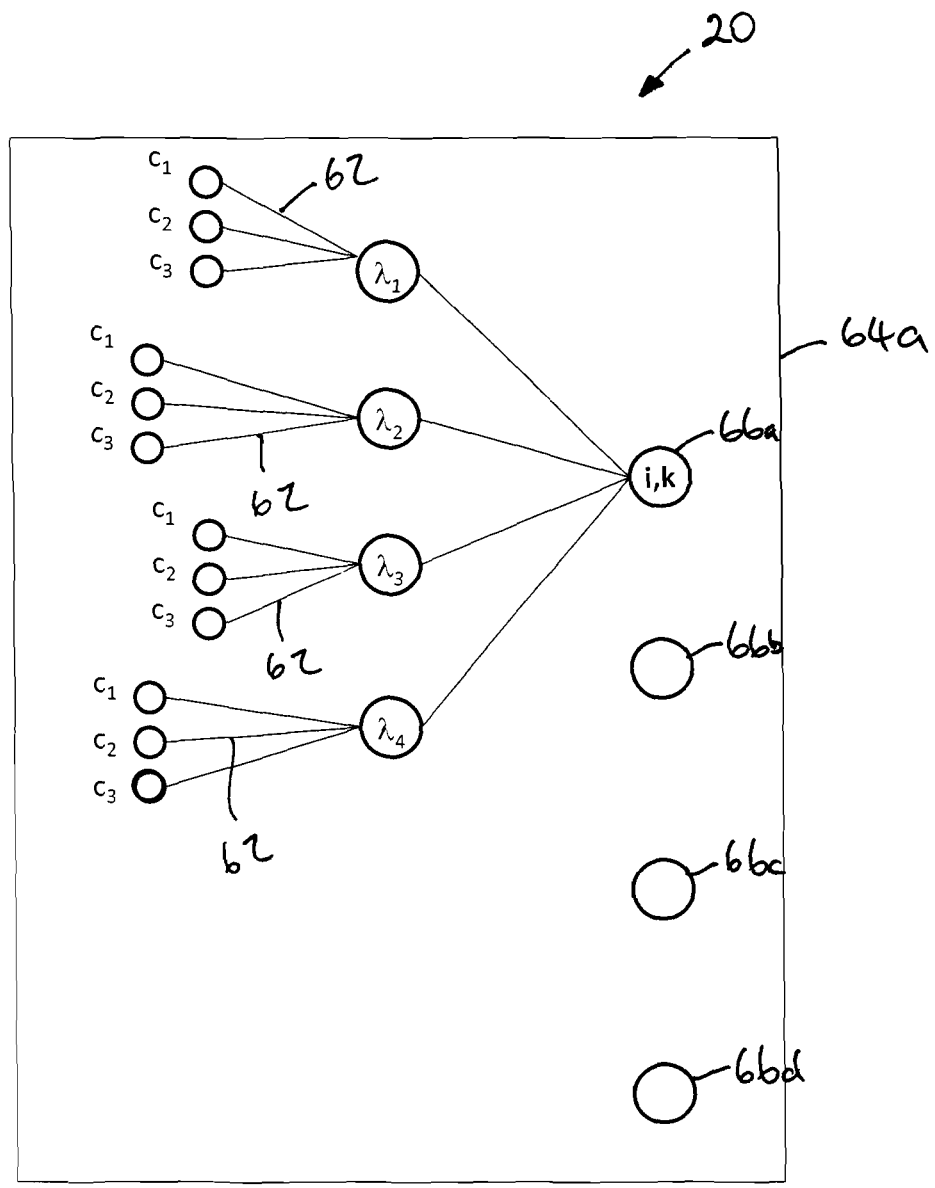
FIG. 4 is a schematic representation of the step of storing received data cells in input buffer virtual output queues (VOQs) of the method of FIG. 1.

Referring to FIGS. 1 and 2(a), in the method 10 of configuring a synchronous optical switch 60 data cells received by each tunable optical transmitter 66 in each transmitter module 64a, 64b, 64c are stored 20 in input buffer virtual output queues (VOQs) 62 associated with each tunable optical transmitter 66. Each tunable optical transmitter has CxL VOQs 62, i.e. twelve VOQs, associated with it in which the received data cells are stored according to the wavelength ($\lambda_{1-4}$) on which they are to be routed and according to the receiver module ($c_{1-3}$) 70 to which they are to be routed, as illustrated in FIG. 4.

Figure 5:
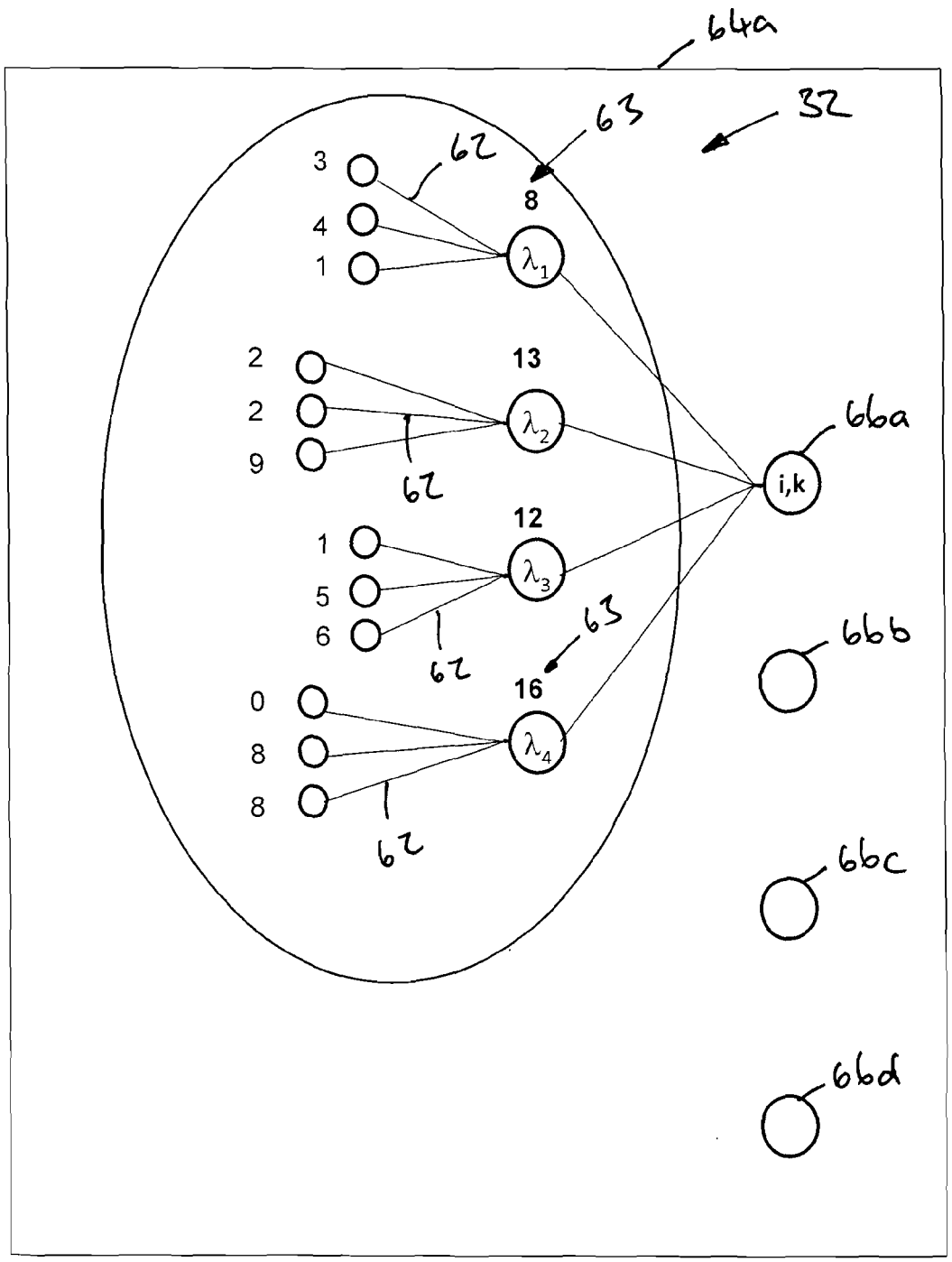
FIG. 5 is a schematic representation of the step of counting the number of cells stored in the virtual output queues (VOQs) for each wavelength of the method of FIG. 1.

In the method 10, the number of received data cells stored in each VOQ 62 is counted and the number of received data cells at each wavelength ($\lambda_{1-4}$) is stored in a counter 63 for each wavelength for each tunable optical transmitter 66a-d, as illustrated in FIG. 5.

Figure 6:
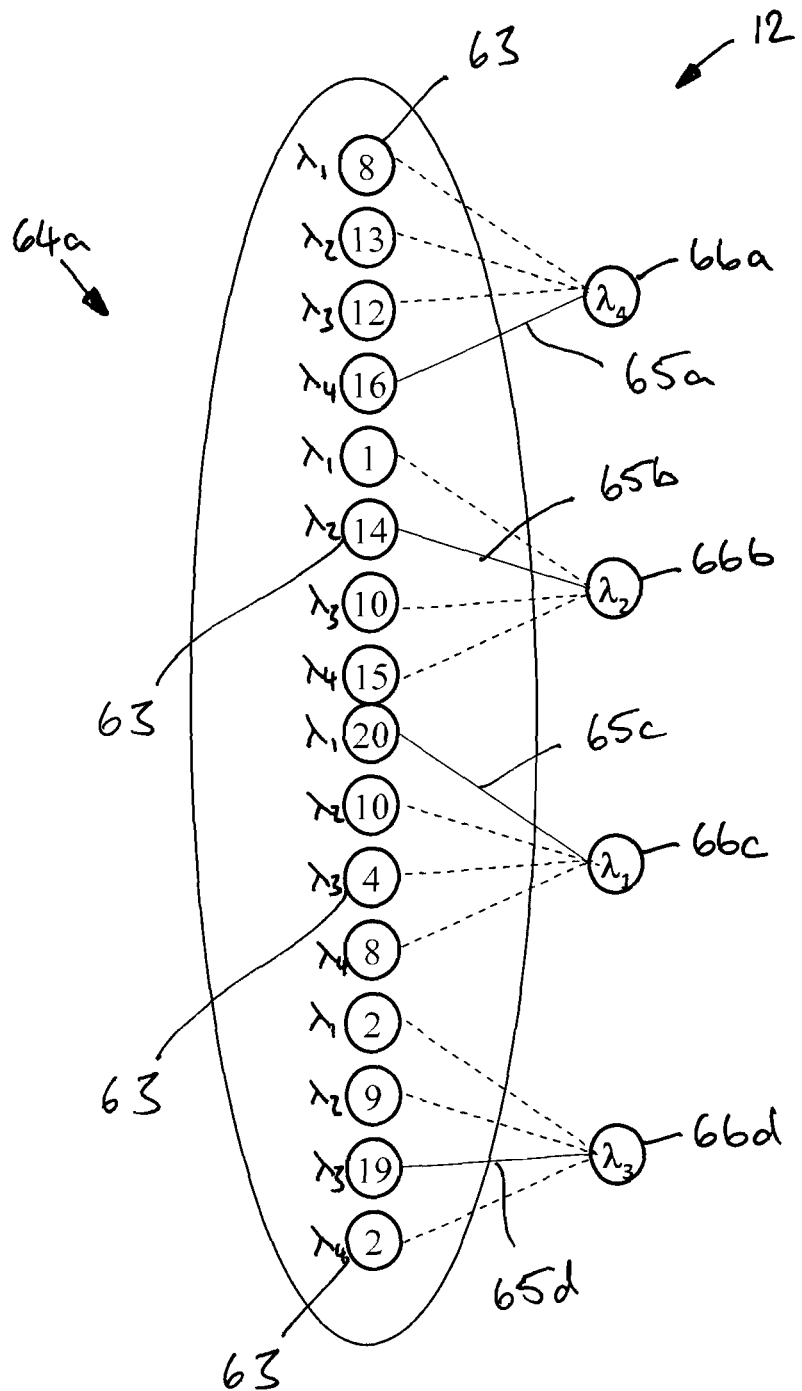
FIG. 6 is a schematic representation of the step of allocating each wavelength associated with the received data cells to a different transmitter (Tx) of the method of FIG. 1.

Referring to FIG. 6, for each transmitter module 64a, 64b, 64c, the method 10 assigns 12 the wavelengths associated with the received data cells to the tunable optical transmitters 66a-d such that each wavelength ($\lambda_{1-4}$) is assigned to a different tunable optical transmitter 66a-d. The method 10 performs the wavelength assignment to the tunable optical transmitters 66a-d simultaneously for each of the transmitter modules 64a, 64b, 64c in the switch 60.

The wavelength assignment 12 is performed as follows, as illustrated in FIGS. 2(a) and 6. The method 10 identifies 24 the counter 63 with the highest count, in this example 20. The counter with the highest count is associated with wavelength $\lambda_1$. $\lambda_1$ is then allocated 26 to the tunable optical transmitter 66c with which the counter is associated and for which the highest counted number of cells were received, as indicated by the solid line 65c in FIG. 6. This tunable optical transmitter 66c will therefore transmit a packet of data cells at $\lambda_1$ and the received data cells at $\lambda_{2-4}$ will not be transmitted by this tunable optical transmitter 66c during the time slot for which the switch 10 is currently being configured (as indicated by the dashed lines).

The method 10 then identifies 28 the counter 63 with the next highest count, in this example 19. The counter with the next highest count is associated with wavelength $\lambda_3$. A check 30 is made to determine whether $\lambda_3$ has been previously allocated to a tunable optical transmitter 66. $\lambda_3$ has not previously been allocated so it is allocated to the tunable optical transmitter 66d with which the counter is associated and for which the cells were received, as indicated by the solid line 65d in FIG. 6. This tunable optical transmitter 66d will therefore transmit a packet of data cells at $\lambda_3$ and the received data cells at $\lambda_{1,2,4}$ will not be transmitted by this tunable optical transmitter 66d during the time slot for which the switch 10 is currently being configured.

The method 10 then checks 34 whether all of the wavelengths have been allocated to a tunable optical transmitter 66. Two wavelengths remain to be allocated and the method therefore returns to identifying 28 the counter 63 with the next highest count, which in this example is 16. The counter with the next highest count is associated with wavelength $\lambda_4$. A check 30 is made to determine whether $\lambda_4$ has been previously allocated to a tunable optical transmitter 66. $\lambda_4$ has not previously been allocated so it is allocated to the tunable optical transmitter 66a with which the counter is associated and for which the cells were received, as indicated by the solid line 65a in FIG. 6. This tunable optical transmitter 66d will therefore transmit a packet of data cells at $\lambda_4$ and the received data cells at $\lambda_{1-3}$ will not be transmitted by this tunable optical transmitter 66a during the time slot for which the switch 10 is currently being configured.

The method 10 then checks 34 whether all of the wavelengths have been allocated to a tunable optical transmitter 66. One wavelength remains to be allocated and the method therefore returns to identifying 28 the counter 63 with the next highest count, which in this example is 15. The counter with the next highest count is associated with wavelength $\lambda_4$. A check 30 is made to determine whether $\lambda_4$ has been previously allocated to a tunable optical transmitter 66. $\lambda_4$ has previously been allocated so the method 10 reverts to identifying 28 with the next highest count 63, which in this example is 14. The counter with the next highest count is associated with wavelength $\lambda_2$. A check 30 is made to determine whether $\lambda_2$ has been previously allocated to a tunable optical transmitter 66. $\lambda_2$ has not previously been allocated so it is allocated to the tunable optical transmitter 66b with which the counter is associated and for which the cells were received, as indicated by the solid line 65b in FIG. 6. This tunable optical transmitter 66b will therefore transmit a packet of data cells at $\lambda_2$ and the received data cells at $\lambda_{1,3,4}$ will not be transmitted by this tunable optical transmitter 66b during the time slot for which the switch 10 is currently being configured.

The allocation of the wavelengths to the transmitters 66 is performed using an algorithm which selects the longest queue. An example of a suitable algorithm is:

```
queue_length[n][l] is a matrix containing the cell count for
    transmitter n
    (n goes from 1 to L) that want to be transmitted over wavelength l
(l goes from 1 to L)
    temp_vector=sort( queue_length[n][l] );
    for each element in temp_vector:
        if(transmitter n is unassigned):
            transmitter n is assigned wavelength l;
        endif
    endfor
```

The wavelengths may alternatively be allocated according to cell age, as illustrated in FIG. 2(b). The allocation of wavelengths proceeds in the same manner as described above, with the modification that instead of identifying the counter with the highest count, the method 10 identifies the oldest cell and allocates the wavelength associated with that cell to the tunable optical transmitter 66 for which the cell was received.

Once all of the wavelengths have been allocated to a different one of the transmitters 66, a control signal is generated for controlling the operating wavelengths of the transmitters 66, to cause the transmitters to tune to the wavelengths allocated to them.

Each of the transmitters 66 in each of the transmitter modules 64a, 64b, 64c now has a wavelength allocated to it, for transmitting the received data cells in its VOQs 62 at its allocated wavelength. The method 10 now proceeds to configuring the optical back plane 76, to allocate 16 each transmitter 66 a connection 74 to an optical receiver 62 configured to receive at the wavelength allocated to the respective transmitter 66. The optical connections 74 are allocated such that each optical switch transmitter module 64a, 64b, 64c has no more than one connection 74 exiting it at each wavelength and each optical receiver module 70 has no more than one connection entering it at each wavelength, as follows.

In the method 10, the tunable optical transmitters 66 that have been allocated a selected wavelength, for example $\lambda_1$, are considered as a set of source nodes 78a and the optical receivers 62 configured to receive that same wavelength ($\lambda_1$) are considered as a set of destination nodes 78b in a bipartite graph 78, as shown in FIG. 7(b).

The method 10 applies an iterative maximal matching scheduling algorithm to find the best matching in the bipartite graph 78. In this example, the iterative maximal matching scheduling algorithm used is the well known iterative serial-line IP (iSLIP) matching algorithm (see for example McKeown, N., "The iSLIP scheduling algorithm for input-queued switches," IEEE/ACM Trans. Netw., vol. 7, no. 2, pp. 188-201, April 1999). It will be appreciated that other scheduling algorithms may alternatively be use, such as an iterative dual round-robin matching (DRRM) algorithm, or a parallel iterative matching (PIM) algorithm, both of which are also well known as scheduling algorithms.

Referring to FIG. 7(a), the iSLIP algorithm schedules the connections between the tunable optical transmitters 66 at $\lambda_1$ and the optical receivers 72 configured to receive at $\lambda_2$, allocating optical connections 74 through the optical backplane 76 as follows: the tunable optical transmitter 66 at $\lambda_1$ in the first transmitter module 64a is allocated the connection 74a to the optical receiver 72 at $\lambda_1$ in the first receiver module 70a; the tunable optical transmitter 66 at $\lambda_1$ in the second transmitter module 64b is allocated the connection 74b to the optical receiver 72 at $\lambda_1$ in the third receiver module 70c; and the tunable optical transmitter 66 at $\lambda_1$ in the third transmitter module 64c is allocated the connection 74c to the optical receiver 72 at $\lambda_1$ in the second receiver module 70b. The best matching is summarized in the bipartite graph representation of the $\lambda_1$ tunable optical transmitters 66 and optical receivers 72.

The method 10 simultaneously schedules the tunable optical transmitters 66 at $\lambda_2, \lambda_3$ and $\lambda_4$ and the optical receivers 72 configured to receive at $\lambda_2, \lambda_3$ and $\lambda_4$ allocating optical connections 74 through the optical backplane 76 for each wavelength.

The method 10 then generates a second control signal to configure the optical connections 74 within the synchronous optical switch 60, as allocated, to connect each tunable optical transmitter 66 to a respective optical connection 74.

The synchronous optical switch 60 is now configured to route received data cells at each of the four wavelengths.

Figure 8:
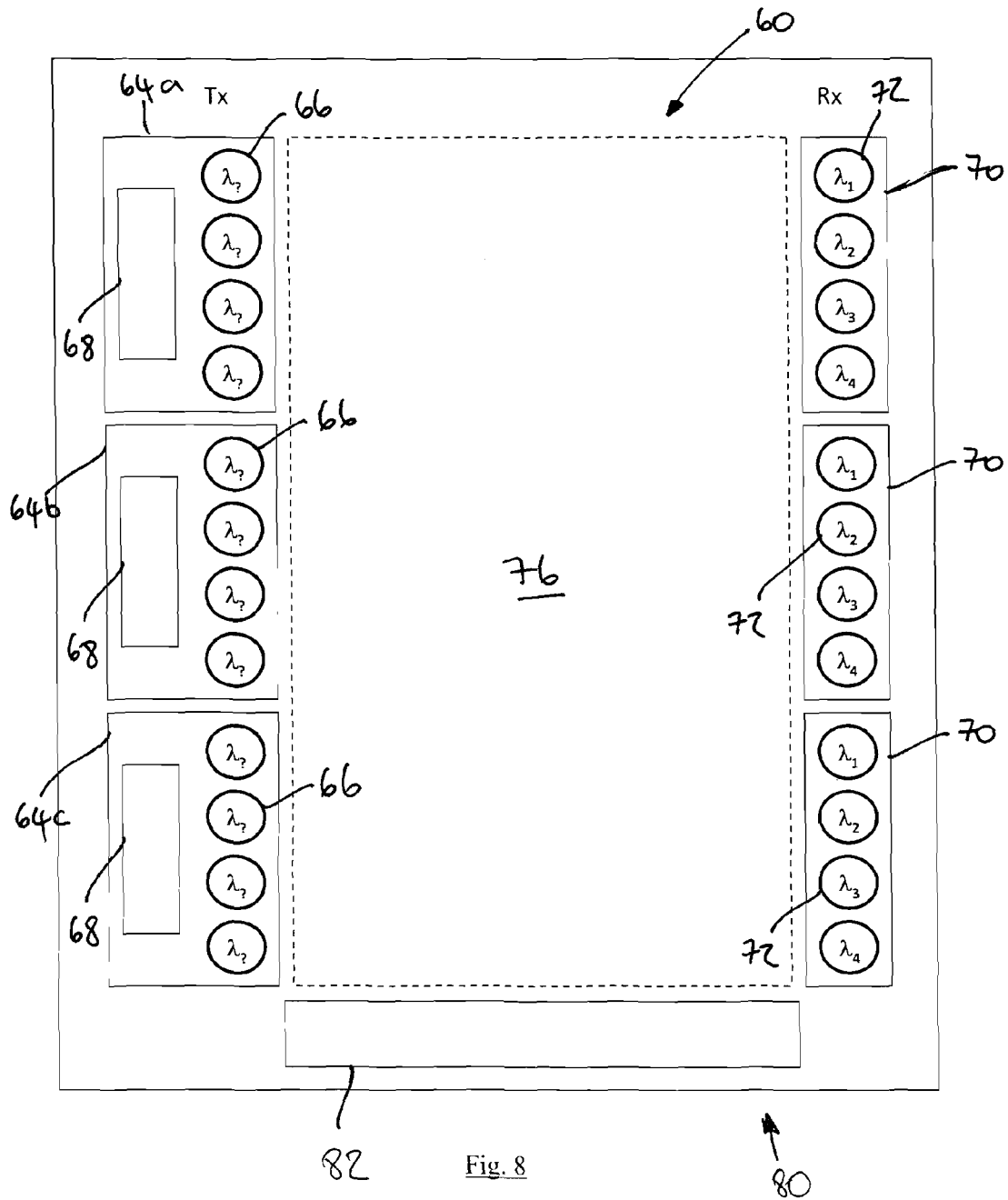
FIG. 8 is a schematic representation of a router according to a second embodiment of the invention.

Referring to FIG. 8, a second embodiment of the invention provides a router 80 comprising a synchronous optical switch 60. The synchronous optical switch 60 is of the same type as shown in FIGS. 3 and 7, but is here shown in more detail.

The synchronous optical switch 60 comprises a switch control unit 82, three optical switch transmitter modules 64a, 64b, 64c, three optical switch receiver modules 70, and an optical backplane 76 providing twelve optical connections (not shown in FIG. 8).

Each transmitter module 64a, 64b, 64c comprises four tunable optical transmitters 66 and a transmitter module control unit 68. Each optical switch receiver module 70 comprises four optical receivers.

Each transmitter module control unit 68 is arranged to assign wavelengths associated with received data cells to the tunable optical transmitters within its respective transmitter module 64a, 64b, 64c, according to the method 10 as described above. Each transmitter module control unit 68 is further operable to generate a control signal for controlling the wavelength setting of each tunable optical transmitter 66 within its respective transmitter module 64a, 64b, 64c.

The switch control unit 82 is arranged to configure the optical back plane 76, to allocate each transmitter 66 a connection 74 to an optical receiver 62 configured to receive at the wavelength allocated to the respective transmitter 66. The optical connections 74 are allocated such that each optical switch transmitter module 64a, 64b, 64c has no more than one connection 74 exiting it at each wavelength and each optical receiver module 70 has no more than one connection entering it at each wavelength, according to the method 10 as described above.

The switch control unit 82 is further arranged to generate a control signal to configure the optical connections 74 within the synchronous optical switch 60, as allocated, to connect each tunable optical transmitter 66 to a respective optical connection 74.

Various modifications may be made to the described embodiments without departing from the scope of the invention. In particular, the method may be used to configure a synchronous optical switch having a different number of optical transmitter modules and optical receiver modules to that described, and each module may respectively have a different number of tunable optical transmitters and optical receivers to that described. It will be appreciated that if the number of tunable optical transmitters and optical receivers is changed then the number of wavelengths and optical connections through the backplane will correspondingly change. It will also be appreciated that the method may be applied to a synchronous optical switch having a different number of optical transmitter modules and optical receiver modules, but that the method will only act on the number of optical transmitter modules for which there is a corresponding number of receiver modules; if, for example, there are more optical receiver modules that optical transmitter modules, the method will only be applied to subset of optical receiver modules equal to the number of optical transmitter modules. The person skilled in the art will also appreciate that the optical transmitter modules and optical receiver modules are only shown as being physically separate for reasons of clarity of the drawings, and they may infact be provided adjacently, within a single transmitter/receiver card.

Where it is described that the wavelength allocation occurs simultaneously for each optical transmitter module it will be appreciated that the allocation may alternatively take place serially. Similarly, where the allocation of optical connections is described as occurring simultaneously for each wavelength it may alternatively occur serially. The received data cells may be stored in a different manner to that described.

The method is described as being applied to received data cells within a single cell time, however the method steps may be pipelined, such that the method is implemented over two or

The invention claimed is:

1. A method of configuring a synchronous optical switch to route received data cells, the synchronous optical switch comprising a first plurality of optical switch transmitter modules each comprising a second plurality of tunable optical transmitters, a first plurality of optical switch receiver modules each comprising a second plurality of optical receivers, and a third plurality of optical connections between said transmitter modules and the said receiver modules, the method comprising the steps:
   a. for each optical switch transmitter module, assigning wavelengths associated with the received data cells to said transmitters such that each said wavelength is assigned to a different one of said transmitters;
   b. for each said module, generating a first control signal for controlling the operating wavelength of each said transmitter;
   c. for each said wavelength, allocating to each transmitter assigned said wavelength one of said optical connections coupled to an optical receiver configured to receive said wavelength, such that each optical switch transmitter module has no more than one connection exiting it at said wavelength and each optical receiver module has no more than one connection entering it at said wavelength; and
   d. generating a second control signal for connecting each said transmitter to the respective said optical connection.

2. A method as claimed in claim 1, wherein the method further comprises, prior to step a., for each tunable optical transmitter storing said received data cells according to wavelength and destination optical switch receiver module data associated with each data cell.

3. A method as claimed in claim 2, wherein the received data cells are stored in an input buffer, the input buffer being partitioned into a number of virtual output queues equal to said plurality of wavelengths multiplied by said plurality of optical switch receiver modules, and the method comprises storing said received data cells in respective virtual output queues according to said wavelength and destination optical switch receiver module data.

4. A method as claimed in claim 2, wherein step a. comprises assigning said wavelengths to said transmitters by:
   i. identifying the greatest number of cells stored at any of said wavelengths for any of said transmitters;
   ii. allocating the wavelength for which said greatest numbers of cells are stored to the respective said transmitter;
   iii. identifying the transmitter having the next greatest number of cells stored at any of said wavelengths for any of said transmitters;
   iv. allocating the wavelength for which said next greatest numbers of cells are stored to the respective said transmitter, unless said wavelength has already been allocated to another transmitter; and
   v. repeating steps iii. and iv. until a different one of said wavelengths has been allocated to each of said transmitters.

5. A method as claimed in claim 4, wherein the method further comprises, for each tunable optical transmitter, counting the number of cells stored in each said virtual output queue for each of said plurality of wavelengths and storing the counted number of cells in a counter for each said wavelength, and step i. comprises identifying the greatest number of cells stored at any of said wavelengths for any of said transmitters by identifying the counter having the largest number of counted cells.

6. A method as claimed in claim 3, wherein step a. is implemented using a select-longest algorithm.

7. A method as claimed in claim 2, wherein step a. comprises assigning said wavelengths to said transmitters by:
   i. identifying the oldest cell stored at any of said wavelengths for any of said transmitters;
   ii. allocating the wavelength for which said oldest cell is stored to the respective said transmitter;
   iii. identifying the next oldest cell stored at any of said wavelengths for any of said transmitters;
   iv. allocating the wavelength for which said next oldest cell is stored to the respective said transmitter, unless said wavelength has already been allocated to another transmitter; and
   v. repeating steps iii. and iv. until a different one of said wavelengths has been allocated to each of said transmitters.

8. A method as claimed in claim 1, wherein step a. is carried out simultaneously for each of said plurality of optical switch transmitter modules.

9. A method as claimed in claim 1, wherein step b. further comprises generating a second control signal for transmitting information identifying the wavelength setting for each said transmitter for use in step c.

10. A method as claimed in claim 1, wherein in step c. said allocation to each transmitter of one of said optical connections comprises, for each said wavelength, considering the transmitters allocated said wavelength as a set of source nodes of a bipartite graph and considering the receivers configured to receive said wavelength as a set of destination nodes of a bipartite graph and applying a maximal matching scheduling algorithm to find the best matching in the bipartite graph.

11. A method as claimed in claim 10, wherein the maximal matching scheduling algorithm is an iterative maximal matching scheduling algorithm.

12. A method as claimed in claim 11, wherein the iterative maximal matching scheduling algorithm comprises one of an iterative serial-line IP (iSLIP) matching algorithm, an iterative dual round-robin matching (DRRM) algorithm, and a parallel iterative matching (PIM) algorithm.

13. A method as claimed in claim 1, wherein step c. is carried out simultaneously for each of said plurality of wavelengths.

14. A router comprising a synchronous optical switch comprising:
   a switch control unit;
   a first plurality of optical switch transmitter modules each comprising a second plurality of tunable optical transmitters and a module control unit;
   a first plurality of optical switch receiver modules each comprising a second plurality of optical receivers; and
   a third plurality of optical connections between said transmitter modules and said receiver modules,
   each module control unit being arranged to assign wavelengths associated with received data cells to said transmitters of its respective said module, such that each wavelength is assigned to a different one of said transmitters, and to generate a first control signal for controlling the wavelength setting of each transmitter, and
   the switch control unit being arranged to, for each wavelength, allocate to each transmitter assigned wavelength one of said optical connections coupled to an optical receiver configured to receive wavelength, such that each optical switch transmitter module has no more than one connection exiting it at said wavelength and each optical receiver module has no more than one connection entering it at said wavelength, and to generate a second control signal for connecting each said transmitter to the respective said optical connection.

15. A computer program product stored on a non-transitory, computer-readable storage medium comprising program code, which when executed by one or more data processors, performs the method of claim 1.

16. A non-transitory, computer-readable storage medium having computer readable instructions embodied therein for providing access to resources available on a router, the computer readable instructions comprising instructions to cause the router to perform the method as claimed in claim 1.

\* \* \* \* \*

UNITED STATES PATENT AND TRADEMARK OFFICE
CERTIFICATE OF CORRECTION

| | | |
|---|---|---|
| PATENT NO. | : 8,929,359 B2 | Page 1 of 1 |
| APPLICATION NO. | : 13/141223 | |
| DATED | : January 6, 2015 | |
| INVENTOR(S) | : Andriolli et al. | |

It is certified that error appears in the above-identified patent and that said Letters Patent is hereby corrected as shown below:

In the Specification

In Column 4, Line 57, delete "DESCRIPTION" and insert -- DETAILED DESCRIPTION --, therefor.

In the Claims

In Column 9, Line 14, in Claim 9, delete "the said" and insert -- said --, therefor.

Signed and Sealed this
Twenty-fifth Day of August, 2015

Michelle K. Lee
*Director of the United States Patent and Trademark Office*